(12) United States Patent
Kitagawa

(10) Patent No.: US 8,773,408 B2
(45) Date of Patent: Jul. 8, 2014

(54) DISPLAY CONTROL APPARATUS, DISPLAY CONTROL METHOD AND PROGRAM

(75) Inventor: Mitsuhiro Kitagawa, Kanagawa (JP)

(73) Assignee: Sony Corporation (JP)

( * ) Notice: Subject to any disclaimer, the term of this patent is extended or adjusted under 35 U.S.C. 154(b) by 1140 days.

(21) Appl. No.: 12/288,945

(22) Filed: Oct. 24, 2008

(65) Prior Publication Data

US 2009/0109199 A1 Apr. 30, 2009

(30) Foreign Application Priority Data

Oct. 31, 2007 (JP) ................................ P2007-283900

(51) Int. Cl.
*G06F 3/038* (2013.01)
*G09G 5/00* (2006.01)

(52) U.S. Cl.
USPC ............ 345/204; 345/173; 715/769; 715/838

(58) Field of Classification Search
None
See application file for complete search history.

(56) References Cited

U.S. PATENT DOCUMENTS

| 2004/0217980 A1* | 11/2004 | Radburn et al. ............... 345/672 |
| 2005/0030299 A1* | 2/2005 | Bursill .......................... 345/204 |
| 2005/0192924 A1* | 9/2005 | Drucker et al. .................. 707/1 |
| 2007/0013708 A1* | 1/2007 | Barcklay et al. ............... 345/557 |
| 2009/0064012 A1* | 3/2009 | Tremblay ...................... 715/764 |

FOREIGN PATENT DOCUMENTS

| JP | 8-317353 A | 11/1996 |
| JP | 11-088866 A | 3/1999 |
| JP | 2001-034383 A | 2/2001 |
| JP | 2001-119570 A | 4/2001 |
| JP | 2002-101329 A | 4/2002 |
| JP | 2006-113801 A | 4/2006 |

* cited by examiner

*Primary Examiner* — Jesus Hernandez
(74) *Attorney, Agent, or Firm* — Lerner, David, Littenberg, Krumholz & Mentlik, LLP

(57) ABSTRACT

Disclosed herein is a display control apparatus for displaying an image from among a plurality of images arrayed in a predetermined order in an enlarged scale, including, a storage section, a detection section, a display control section, and a decoding section.

6 Claims, 9 Drawing Sheets

DISPLAY CONTROL APPARATUS, DISPLAY CONTROL METHOD AND PROGRAM

CROSS-REFERENCE TO RELATED APPLICATIONS

The present application claims priority from Japanese Patent Application No. JP 2007-283900, filed in the Japanese Patent Office on Oct. 31, 2007, the entire content of which is incorporated herein by reference.

BACKGROUND OF THE INVENTION

1. Field of the Invention

This invention relates to a display control apparatus, a display control method and a program.

2. Description of the Related Art

In recent years, a style wherein photographs or images picked up by a digital camera are fetched into a recording apparatus which includes a recording medium such as a hard disk and are displayed on a television receiver so that a user may observe them has been proposed. According to the style described, a number of people such as all families can enjoy a photograph (hereinafter referred to sometimes simply as photo).

Japanese Patent Laid-Open No. 2001-119570 discloses a technique that an additional VRAM (Video Random Access Memory) is prepared such that data to be used to display an image of such a magnification that more than a fixed period of time is required to read out the image from a memory are stored into the additional VRAM.

SUMMARY OF THE INVENTION

In order to display a photograph on a television receiver, various processes are required such as to read out data of a photograph of a display object from a hard disk, expand the data into a memory and decode the data which are in a state compressed in accordance with a predetermined recording format.

Since such processes require some period of time, the user must wait for some time until the photograph is displayed after it is selected.

In order to solve the problem described, a method is available wherein, while a resource such a CPU (Central Processing Unit) is not used, photographs which may possibly be displayed next are expanded into another memory area so that the time required to display a photograph of an object of display after it is selected by the user is reduced. A period within which the user enjoys some photograph or within a like period, a comparatively great margin is available with resources, and therefore, a process for making preparations for next display is carried out at a timing within such a period as described above.

In the following description, to read out data of photographs different from a photograph displayed actually from a recording medium, expand the data into a free area of a memory and carry out a decoding process and so forth suitably to prepare decoded data to be used for display in advance is referred to as "reading ahead".

However, the memory is limited in storage capacity and the number of photographs which can be read ahead is restricted.

If a photograph which is not read ahead is selected as a photograph of an object of display, naturally the photograph cannot be displayed rapidly. Since most apparatus are configured so as to allow a user to freely determine a photograph to be displayed next by operating a left or right key of a remote controller, although it is impossible to read ahead a photograph whose displaying instruction is to be issued next with certainty, it is significant how to determine photographs as an object of reading ahead.

Therefore, it is desirable to provide a display control apparatus, a display control method and a program which make it possible to prepare in advance decoded data of images whose displaying instruction may possibly be issued in response to an operation direction by a user.

According to an embodiment of the present invention, there is provided a display control apparatus for displaying an image from among a plurality of images arrayed in a predetermined order in an enlarged scale, including storage means having a storage area sufficient to store decoded data of a plurality of images, detection means for detecting an operation in a predetermined direction by a user, display control means for causing, when an image is to be displayed in an enlarged scale in response to detection of an operation by the user by the detection means, an image of an object to be displayed in an enlarged scale based on the decoded data stored in the storage means so as to be used for display of the image of the object, and decoding means for storing the decoded data of a predetermined number of images positioned in a direction corresponding to the direction of the operation by the user with reference to the position of the image displayed by the display control means in the array of the images in the predetermined order into the storage means and storing the decoded data of a number of images smaller than the predetermined number which are positioned in a direction corresponding to a direction opposite to the direction of the operation by the user into the storage means.

The decoding means may store the decoded data of one image positioned in the direction corresponding to the direction of the operation by the user into the storage means and then store the decoded data of one image positioned in the direction corresponding to the direction opposite to the direction of the operation by the user into the storage means.

In this instance, the decoding means may store the decoded data of one image positioned in the direction corresponding to the direction opposite to the direction of the operation by the user into the storage means and then store the decoded data of an image or images positioned in the direction corresponding to the direction of the operation by the user into the storage means.

According to another embodiment of the present invention, there is provided a display control method for a display control apparatus which includes storage means having a storage area sufficient to store decoded data of a plurality of images and displays an image from among a plurality of images arrayed in a predetermined order in an enlarged scale, or a program for causing a computer to execute a display control process for a display control apparatus which includes storage means having a storage area sufficient to store decoded data of a plurality of images and displays an image from among a plurality of images arrayed in a predetermined order in an enlarged scale, the display control method or program including the steps of detecting an operation in a predetermined direction by a user, causing, when an image is to be displayed in an enlarged scale in response to detection of an operation by the user, an image of an object to be displayed in an enlarged scale based on the decoded data stored in the storage means so as to be used for display of the image of the object, and storing the decoded data of a predetermined number of images positioned in a direction corresponding to the direction of the operation by the user with reference to the position of the displayed image in the array of the images in the predetermined order into the storage means and storing the decoded data of a number of images smaller than the predetermined number which are positioned in a direction corresponding to a direction opposite to the direction of the operation by the user into the storage means.

In the display control apparatus, display control method and display control process by the program, an operation in a predetermined direction by a user is detected. Then, when an image is to be displayed in an enlarged scale in response to detection of an operation by the user, an image of an object is displayed in an enlarged scale based on the decoded data stored in the storage means so as to be used for display of the image of the object. Thereafter, the decoded data of a predetermined number of images positioned in a direction corresponding to the direction of the operation by the user with reference to the position of the displayed image in the array of the images in the predetermined order are into the storage means. Furthermore, the decoded data of a number of images smaller than the predetermined number which are positioned in a direction corresponding to a direction opposite to the direction of the operation by the user are stored into the storage means.

With the display control apparatus, display control method and program, it is possible to prepare in advance decoded data of images whose displaying instruction may possibly be issued in response to the direction of the operation by the user.

DETAILED DESCRIPTION OF THE PREFERRED EMBODIMENT

Figure 1:
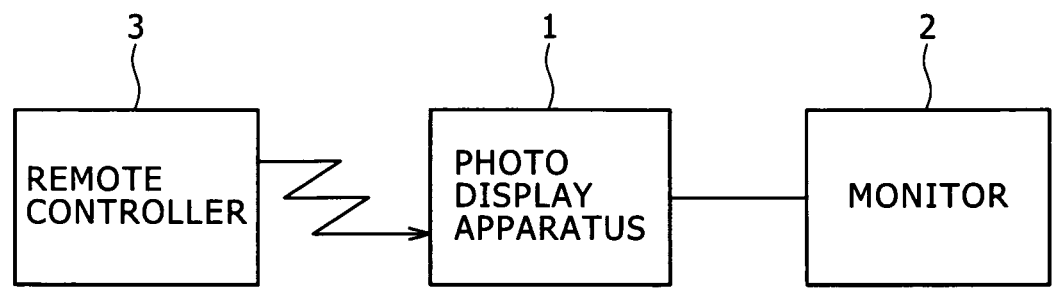
FIG. 1 is a block diagram showing an example of a configuration of a system including a photograph display apparatus to which an embodiment of the present invention is applied.

FIG. 1 shows an example of a system which includes a photograph display apparatus 1 to which an embodiment of the present invention is applied.

Referring to FIG. 1, the photograph display apparatus 1 is connected to a monitor 2 such as a television receiver through a cable or the like. The user can operate a remote controller 3 to cause the photograph display apparatus 1 to carry out various processes.

The photograph display apparatus 1 fetches photograph data from another apparatus which handles photographs such as a digital camera, a personal computer or a photo storage and records the fetched photograph data on a built-in recording medium such as a hard disk or a flash memory. Then, the photograph display apparatus 1 causes the monitor 2 to display a photograph based on the photograph data recorded in the recording medium.

If the user causes the photograph display apparatus 1 to fetch and record a plurality of photographs picked up by a digital camera or the like, then the user can operate the remote controller 3 to select a photograph from among the recorded photographs and display the selected photograph in an enlarged scale on the monitor 2.

The remote controller 3 has, for example, three keys including a left key, a right key and a start/end key provided thereon.

The left key is operated to change over the photograph to be displayed in an enlarged scale to a photograph positioned leftwardly adjacent to the photograph currently displayed in an enlarged scale. The right key is operated to change over the photograph to be displayed in an enlarged scale to another photograph positioned rightwardly adjacent to the currently displayed photograph.

As hereinafter described, a plurality of photographs recorded in the photograph display apparatus 1 are arrayed virtually in a predetermined order in accordance with the image pickup date and time, the name (file name) or the like. In the photograph display apparatus 1, the photograph to be displayed in an enlarged scale is changed over such that a photograph positioned next to the position of a photograph displayed currently in a direction indicated by an operation of the user is displayed newly.

The start/end key is operated in order to start/end accessing to photographs. If the start/end key is depressed in a state wherein no photograph is displayed in an enlarged scale, then display of one photograph currently selected through a cursor or the like is started. On the other hand, if the start/end key is depressed in a state wherein some photograph is displayed in an enlarged scale, then the display of the photograph is ended.

Figure 2:
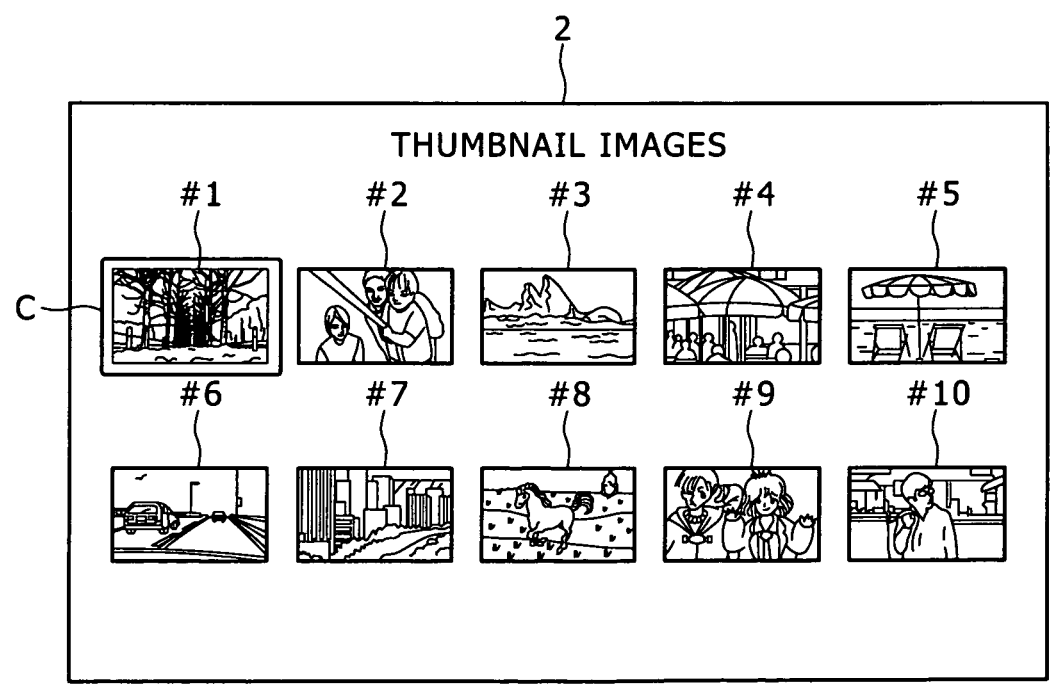
FIGS. 2 and 3 are schematic views showing different examples of a screen image displayed on a monitor shown in FIG. 1.

FIG. 2 shows an example of a screen image displayed on the monitor 2.

In the example of FIG. 2, 10 thumbnail images of different photographs #1 to #10 are displayed. For example, thumbnail images of photographs stored in one folder are displayed in a table.

Further, in the example of FIG. 2, a cursor C is positioned at the photograph #1, and the user can operate the left key or the right key of the remote controller 3 to move the cursor C to an arbitrary photograph.

Figure 3:
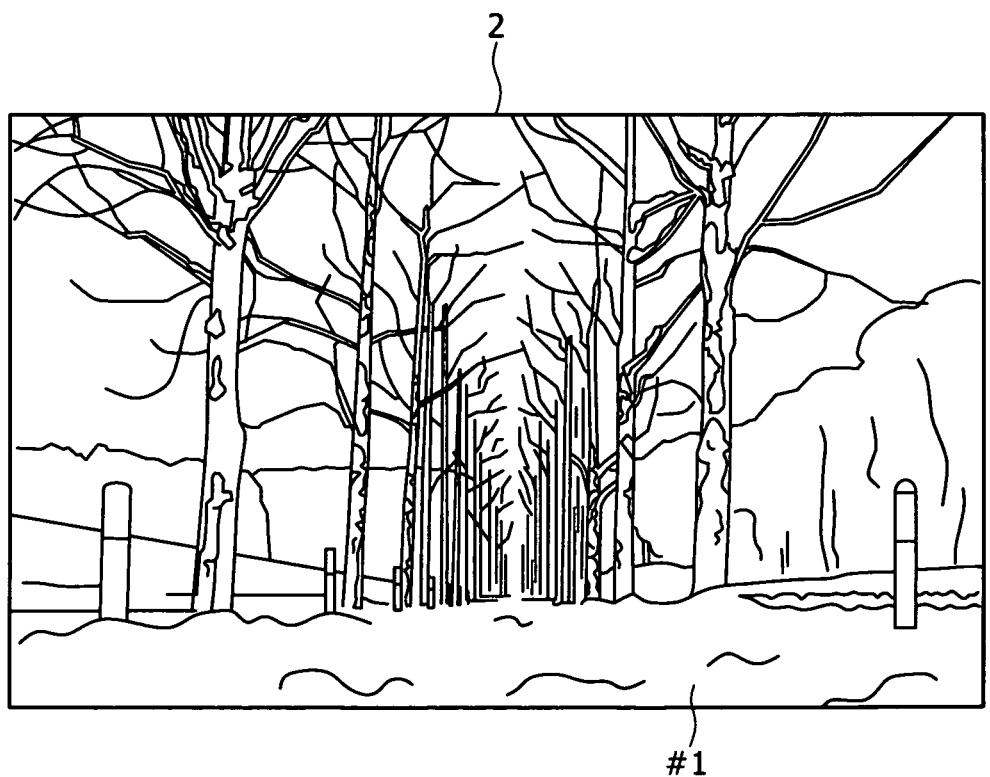

If the start/end key is depressed in the state of FIG. 2 in which the cursor C is positioned at the photograph #1, then the photograph #1 is displayed in an enlarged scale on the monitor 2 as seen in FIG. 3. The user can confirm the photograph #1 in detail.

For example, if the right key is depressed once in the state wherein the photograph #1 is displayed in an enlarged scale as seen in FIG. 3, then the photograph #2 is displayed in an enlarged scale in place of the photograph #1 on the monitor 2. Further, if the right key is depressed once in the state wherein the photograph #2 is displayed in an enlarged scale, then the photograph #3 is displayed in place of the photograph #2 on the monitor 2.

In particular, in the array of the photographs #1 to #10, the photograph #2 is a photograph positioned rightwardly adjacent to the photograph #1, and the photograph #3 is a photograph positioned rightwardly adjacent to the photogram #2.

On the contrary, if the left key is depressed once in the state wherein the photograph #3 is displayed in an enlarged scale, then the photograph #2 is displayed in place of the photograph #3 on the monitor 2. Further, if the left key is displayed once in the state wherein the photograph #2 is displayed in an enlarged scale, then the photograph #1 is displayed in place of the photograph #2 on the monitor 2.

Figure 4:
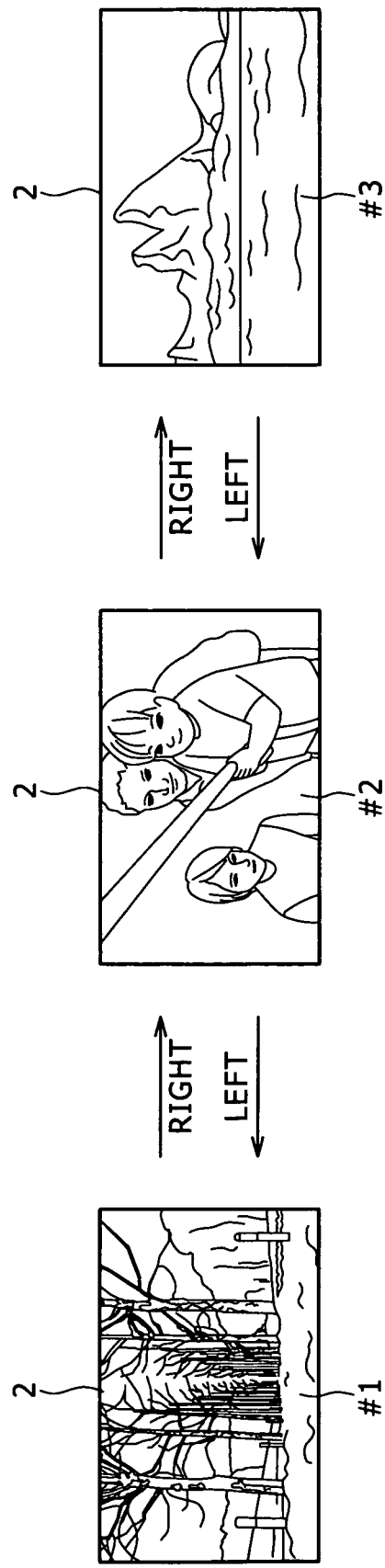
FIG. 4 is a schematic view illustrating an example of operation by a user and changeover of a photograph by the photograph display apparatus shown in FIG. 1.

FIG. 4 illustrates such a relationship as described above between operations of the right and left keys and photographs displayed. Only if the user operates the right key or/and the left key in this manner, then the user can change over the photograph to be displayed in an enlarged scale. Also any other photograph can be similarly displayed by such changeover as just described.

It is to be noted that, if the left key is depressed once in a state wherein the photograph #1 is displayed in an enlarged scale, then the photograph #10 is displayed in place of the photograph #1 on the monitor 2. On the other hand, if the right key is depressed once in the state wherein the photograph #10 is displayed in an enlarged scale, then the photograph #1 is displayed in place of the photograph #10 on the monitor 2.

Figure 5:
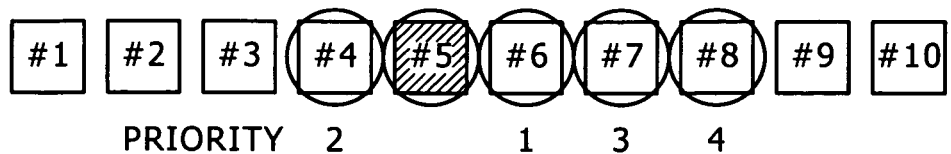
FIG. 5 is a schematic view showing an array of photographs.

FIG. 5 illustrates an array of the photographs #1 to #10.

If the photographs #1 to #10 are arrayed in the leftward and rightward direction or horizontal direction same as the direction of operation by the user in accordance with a predetermined order such as the order of the image pickup date and time or of the name, then they are arrayed in such a manner as seen in FIG. 5. Each of blocks arrayed in the horizontal direction indicates one photograph.

The photograph display apparatus 1 which changes over its display in such a manner as described above carries out reading ahead by a predetermined number of photographs at a predetermined position with reference to the position of a photograph which is displayed actually. The "reading ahead" signifies to read out data of photographs different from a photograph displayed actually from a recording medium, expand the read out data into a free area of a memory and carry out such a process as decoding and so forth suitably to prepare decoded data to be used for display in advance as described hereinabove.

For example, if the cursor C is positioned at the photograph #5 on such a screen image as shown in FIG. 2 and then the start/end key is operated to issue an instruction to display the photograph in an enlarged scale, then such processes as decoding are carried out for data of the photograph #5, and the photograph #5 is displayed in an enlarged scale based on the decoded data on the monitor 2. In FIG. 5, that the block of the photograph #5 is indicated by slanting lines represents that the photograph #5 is displayed actually.

After the photograph #5 is displayed, the photograph display apparatus 1 successively carries out reading ahead of photographs in the descending order of the priority in accordance with priority values indicated below the photographs in FIG. 5.

In the example of FIG. 5, with reference to the photograph #5, the priority value 1 is set to the photograph #6 which is the next or rightwardly adjacent photograph in the array of the photographs #1 to #10, and the priority value 2 is set to the photograph #4 which is the preceding or leftwardly adjacent photograph in the array of the photographs #1 to #10.

Further, with reference to the photograph #5, the priority value 3 is set to the photograph #7 which is next to the photograph #6 to which the priority value 1 is set, and the priority value 4 is set to the photograph #8 which is second next to the photograph #6.

The priority is set in the descending order of the probability in which the photograph may be designated so as to be displayed next.

In particular, in the example illustrated in FIG. 5, the priority is set assuming that the photographs on the opposite sides of the photograph displayed actually may be designated so as to be displayed next with high possibility and those photographs arranged successively in the rightward direction may be designated so as to be displayed next with decreasing probability in accordance with the order. Further, from between the photographs on the opposite sides of the photograph displayed actually, the rightwardly adjacent photograph may be designated with higher possibility so as to be displayed than the leftwardly adjacent photograph. Usually, the display of a photograph is changed over frequently in accordance with the order of the image pickup date and time or of the name.

In FIG. 5, that the blocks of the photographs #4 to #8 are surrounded by a circle represents that decoded data of the photographs are stored in the memory through reading ahead or the like.

Figure 6:
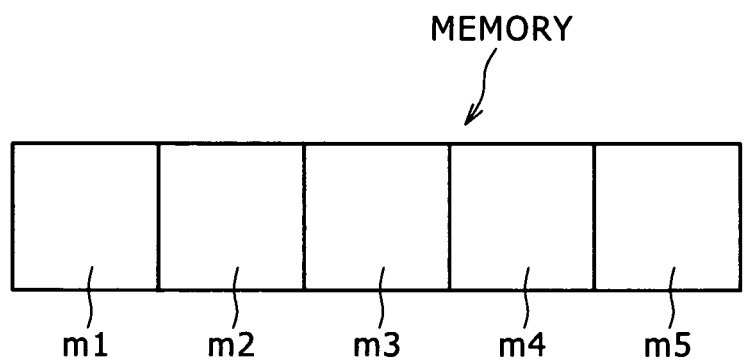
FIG. 6 is a schematic view showing an example of areas of a memory provided in the photograph display apparatus shown FIG. 1.

FIG. 6 illustrates an example of areas of the memory provided in the photograph display apparatus 1.

Where the photograph display apparatus 1 is configured such that four photographs other than one photograph displayed actually are read ahead, the memory has five areas into which decoded data of different photographs can be stored as seen in FIG. 6.

One of the areas $m_1$ to $m_5$ shown in FIG. 6 has stored therein decoded data of a photograph displayed actually while the other four areas are used for reading ahead of four photographs.

Figure 7:
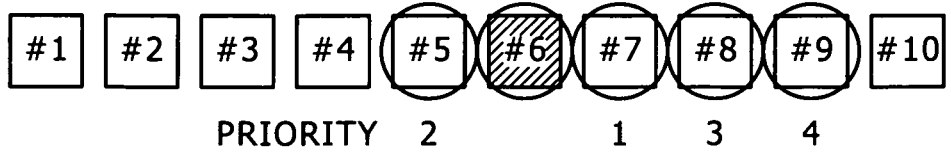
FIGS. 7 and 8 are schematic views illustrating different concepts of reading ahead by the photograph display apparatus shown in FIG. 1.

FIG. 7 illustrates a manner of reading ahead when, in a state wherein the photograph #5 is displayed as seen in FIG. 5 and the photograph #4 and the photographs #6 to #8 are read ahead, the right key of the remote controller 3 is depressed once to issue an instruction to display the photograph #6.

When the right key is depressed once, the photograph #6 is displayed based on the decoded data read ahead and stored in advance in the memory. Since there is no necessity to read out the data of the photograph #6 from the recording medium or to decode the data, the photograph #6 can be displayed more rapidly by time required for such processing.

After the photograph #6 is displayed, the photograph display apparatus 1 updates the setting of the priority and successively carries out reading ahead of photographs in accordance with the updated priority illustrated in FIG. 7.

In the example of FIG. 7, with reference to the photograph #6, the priority value 1 is set to the photograph #7 which is the adjacent photograph in the direction same as the direction of the operation by the user, and the priority value 2 is set to the photograph #5 which is the adjacent photograph in the direction opposite to the direction of the operation by the user.

Further, with reference to the photograph #6, the priority value 3 is set to the photograph #7 which is in the direction same as the direction of the operation by the user, and the priority value 4 is set to the photograph #8.

In the state of FIG. 7, the decoded data of the photograph #4 are deleted from the memory and the decoded data of the photograph #9 are stored in the memory instead in comparison with the state of FIG. 5 which illustrates the state before the right key is depressed. The decoded data of the photographs #5, #6, #7 and #8 prepared already in the state of FIG. 5 are kept stored as they are.

In the example of FIG. 7, the priority is set assuming that, also when the right key is depressed, the user thereafter carries out operation similar to that when the start/end key is depressed.

In this manner, when the right key is operated, the priority is set such that, with reference to a photograph displayed actually, three photographs positioned in the rightward direction same as the direction of the operation by the user and one photograph positioned in the leftward direction opposite to the direction of the operation by the user are read ahead.

Figure 8:
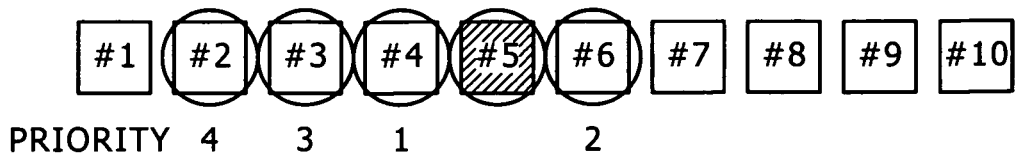

FIG. 8 illustrates a manner of reading ahead when, in a state wherein the photograph #6 is displayed as seen in FIG. 7 and the photograph #5 and the photographs #7 to #9 are read ahead, the left key of the remote controller 3 is depressed once to issue an instruction to display the photograph #5.

When the left key is depressed once, the photograph #5 is displayed based on the decoded data read ahead and stored in advance in the memory. Since there is no necessity to read out the data of the photograph #5 from the recording medium or to carry out decoding of the data, the photograph #5 can be displayed more rapidly by time required for the processes.

After the photograph #5 is displayed, the photograph display apparatus 1 updates the setting of the priority and successively carries out reading ahead of photographs in accordance with priority values illustrated in FIG. 8.

In the example of FIG. 8, with reference to the photograph #5, the priority value 1 is set to the photograph #4 which is the next photograph in the direction same as the direction of the operation by the user, and the priority value 2 is set to the photograph #6 which is the next photograph in the direction opposite to the direction of the operation by the user.

Further, with reference to the photograph #5, the priority value 3 is set to the photograph #3 which is positioned in the direction same as the direction of the operation by the user, and the priority value 4 is set to the photograph #2.

In the state of FIG. 8, the decoded data of the photographs #7, #8 and #9 are deleted from the memory and instead the decoded data of the photographs #2, #3 and #4 are stored in the memory in comparison with the state of FIG. 7 before the left key is depressed. The decoded data of the photographs #5 and #6 prepared already in the state of FIG. 7 remain stored as they are.

In the present example, the priority is set assuming that, contrary to the case when the start/end key is depressed or when the right key is depressed, the probability is high that an instruction to display an image or images positioned in the leftward direction may be issued successively.

In this manner, when the left key is operated, the priority is set such that three photographs positioned in the leftward direction same as the direction of operation by the user with reference to a photograph displayed actually and one photograph positioned in the rightward direction opposite to the direction of operation by the user are read ahead.

In this manner, the photograph display apparatus 1 carries out reading ahead taking the probability of next display instruction into consideration and prepares a plurality of reading ahead patterns such that one of the reading ahead patterns is selectively used in response to an operation of the user to carry out reading ahead. Consequently, the reading ahead can be carried out efficiently.

Figure 9:
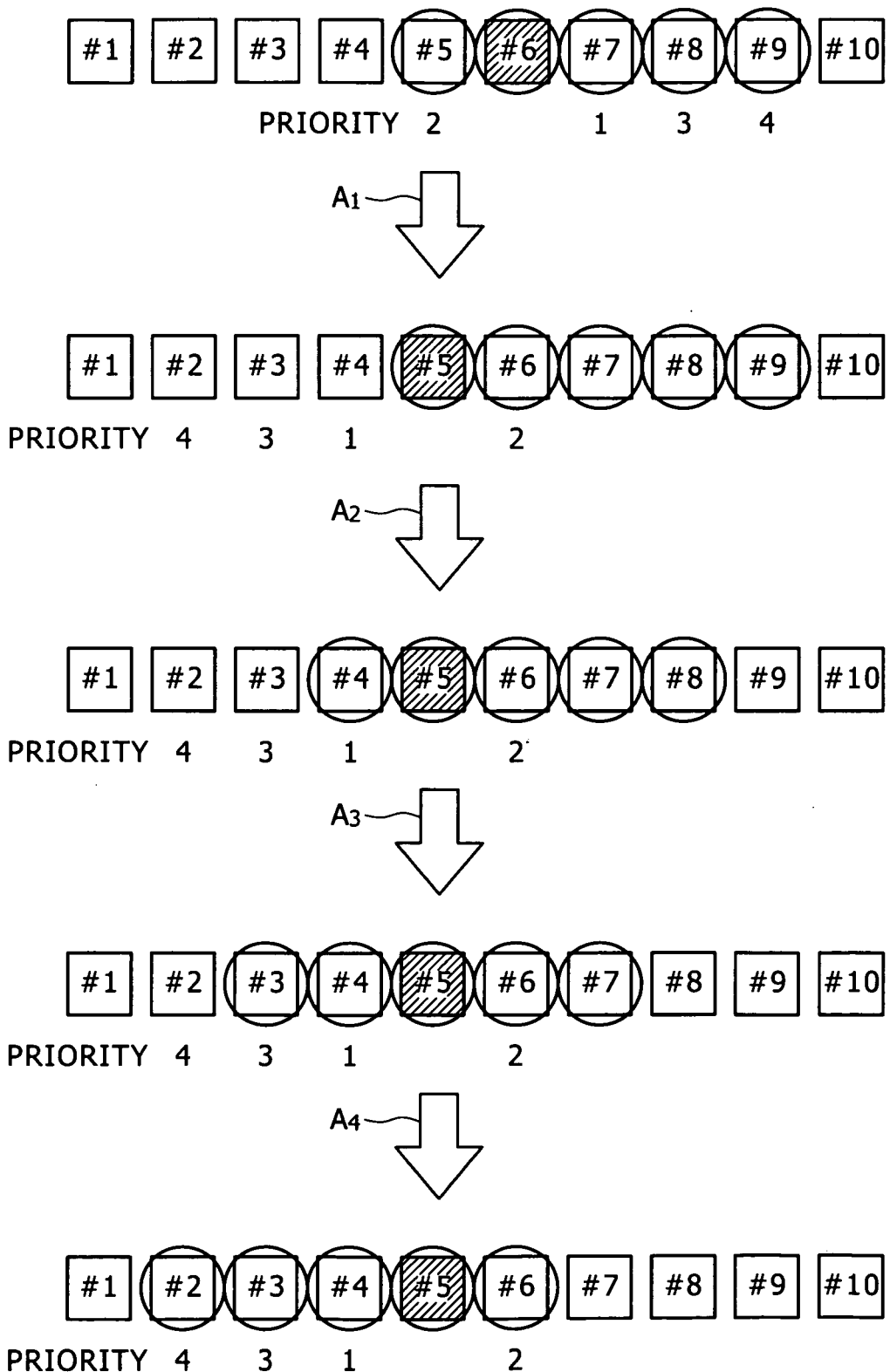
FIGS. 9 and 10 are schematic views illustrating different transitions of reading ahead by the photograph display apparatus shown in FIG. 1.

FIG. 9 illustrates an example of a procedure of reading ahead.

The uppermost stage of FIG. 9 illustrates a state same as the state of FIG. 7 wherein, as a result of depression of the right key once in a state wherein, for example, the photograph #5 is displayed, the photograph #6 is displayed and the photographs #5 and #7 to #9 are read ahead.

If, in this state, the left key is depressed once, then as seen from a state indicated by a blank arrow mark $A_1$, the photograph #5 is displayed based on the decoded data read ahead and stored in the memory in advance.

Further, the setting of the priority is updated in response to the change of the reading ahead pattern, and the priority value 1 is set to the photograph #4 and the priority value 2 is set to the photograph #6 while the priority value 3 is set to the photograph #3 and the priority value #4 is set to the photograph #2.

Finally, the decoded data of the photograph #5 displayed actually and the decoded data of the photographs #2, #3, #4 and #6 of the object of reading ahead are stored.

Then, as indicated by a blank arrow mark $A_2$, the decoded data of the photograph #9 are deleted from the memory, and reading ahead of the photograph #4 set to the priority value 1 is carried out to store the decoded data of the photograph #4 into the memory.

Since the photograph #9 is positioned remotest from the actually displayed photograph #5 from among the photographs #7 to #9 which are brought out of an object of reading ahead, the decoded data of the photograph #9 are deleted as data which are not required any more. In this manner, the decoded data of any photograph which has been placed out of an object of reading ahead are deleted one by one in the descending order of the distance from the photograph displayed actually.

Thereafter, as indicated by a blank arrow mark $A_3$, the decoded data of the photograph #8 are deleted from the memory and reading ahead of the photograph #3 to which the priority value 3 is set is carried out to store the decoded data of the photograph #3 into the memory. Since the decoded data are stored in the memory since a point of time before the left key is depressed, no decoding or the like is carried out for the photograph #6 to which the priority value 2 is set.

Then as indicated by a blank arrow mark $A_4$, the decoded data of the photograph #7 are deleted from the memory, and reading ahead of the photograph #2 to which the priority value 4 is set is carried out instead to store the decoded data of the photograph #2 into the memory.

In this manner, when the reading ahead pattern changes, the decoded data of photographs brought out of an object of reading ahead are deleted not at a time from the memory but are deleted one by one photograph so that the reading ahead is carried out efficiently.

Here, an advantage where decoded data of photographs brought out of an object of reading ahead are deleted one by one photograph is described with reference to FIG. 10.

Figure 10:
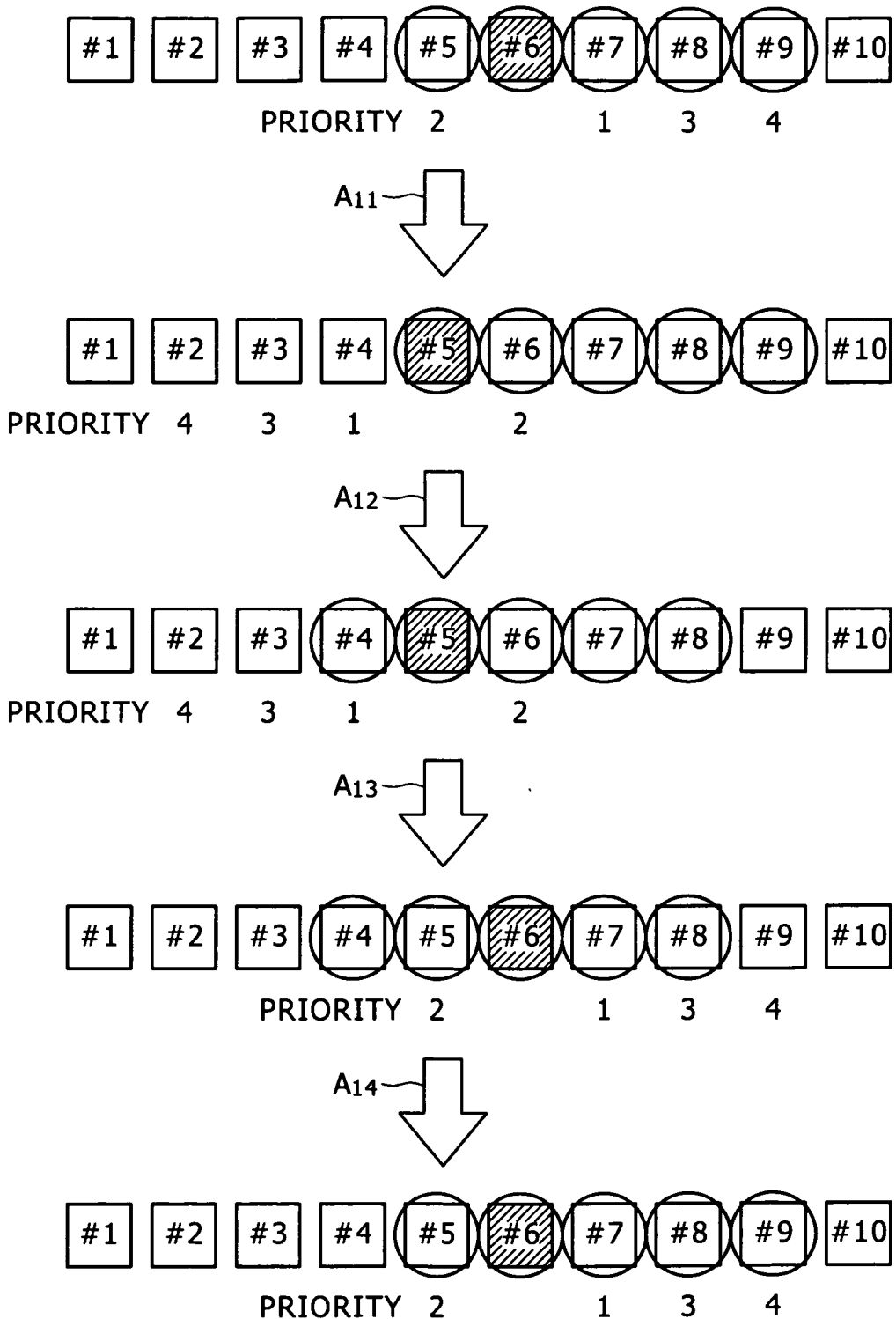

The state illustrated at the uppermost stage of FIG. 10 is same as the state illustrated at the uppermost stage of FIG. 9, and the state indicated by a blank arrow mark $A_{11}$ of FIG. 10 is same as the state indicated by the blank arrow mark $A_1$ of FIG. 9. The state indicated by a blank arrow mark $A_{12}$ of FIG. 10 is same as that indicated by the blank arrow mark $A_2$ of FIG. 9.

In particular, if the left key is depressed once in a state wherein the photograph #6 is displayed and the photographs #5 and #7 to #9 are read ahead already, then the photograph #5 is displayed as indicated by the blank arrow mark $A_{11}$. Meanwhile, the priority value 1 is set to the photograph #4 and the priority value 2 is set to the photograph #6. Further, the priority value 3 is set to the photograph #3, and the priority value 4 is set to the photograph #2.

Thereafter, as indicated by the blank arrow mark $A_{12}$, the decoded data of the photograph #9 are deleted and the decoded data of the photograph #4 are stored into the memory.

If, in this instance, the right key is depressed once and the photograph of an object of display is returned to that immediately prior to depression of the right key, then the photograph #6 is displayed based on the decoded data read ahead and stored in the memory in advance as indicated by a blank arrow mark $A_{13}$. Further, in response to the change of the reading ahead pattern, the priority value 1 is set to the photograph A7 and the priority value 2 is set to the photograph #5. Further, the priority value 3 is set to the photograph #8, and the priority value 4 is set to the photograph #9.

Finally, the decoded data of the photograph #6 displayed actually and the decoded data of the photographs #5, #7, #8 and #9 which may become an object of reading ahead are stored in the memory.

Then, as indicated by a blank arrow mark $A_{14}$, the decoded data of the photograph #4 are deleted from the memory and reading ahead of the photograph #9 to which the priority value 4 is set is carried out to store the decoded data of the photograph #9 into the memory.

Since the decoded data are stored already at a point of time before the right key is depressed, decoding of the photograph #5 to which the priority value 2 is set is not carried out.

Further, decoding and so forth of the photograph #7 to which the priority value 1 is set and the photograph #8 to which the priority value 3 is set are not carried out because the photographs #7 and #8 were not an object of reading ahead before the right key is depressed but become an object of reading ahead again before the decoded data thereof are deleted.

In other words, the reading ahead is completed only if decoding and so forth of the photograph #9 to which the priority value 4 is set are carried out.

By deleting decoded data of those photographs which are brought out of an object of reading ahead one by one photograph from the memory as occasion demands without deleting them at a time from the memory in this manner, even if the reading ahead pattern changes again, there is no necessity to carry out reading ahead again, but the reading ahead can be completed rapidly.

Further, the probability that data prepared in the memory by reading ahead may be used actually for display can be raised.

A series of processes of the photograph display apparatus 1 which carries out reading ahead in such a manner as described above are hereinafter described with reference to a flow chart.

Figure 11:
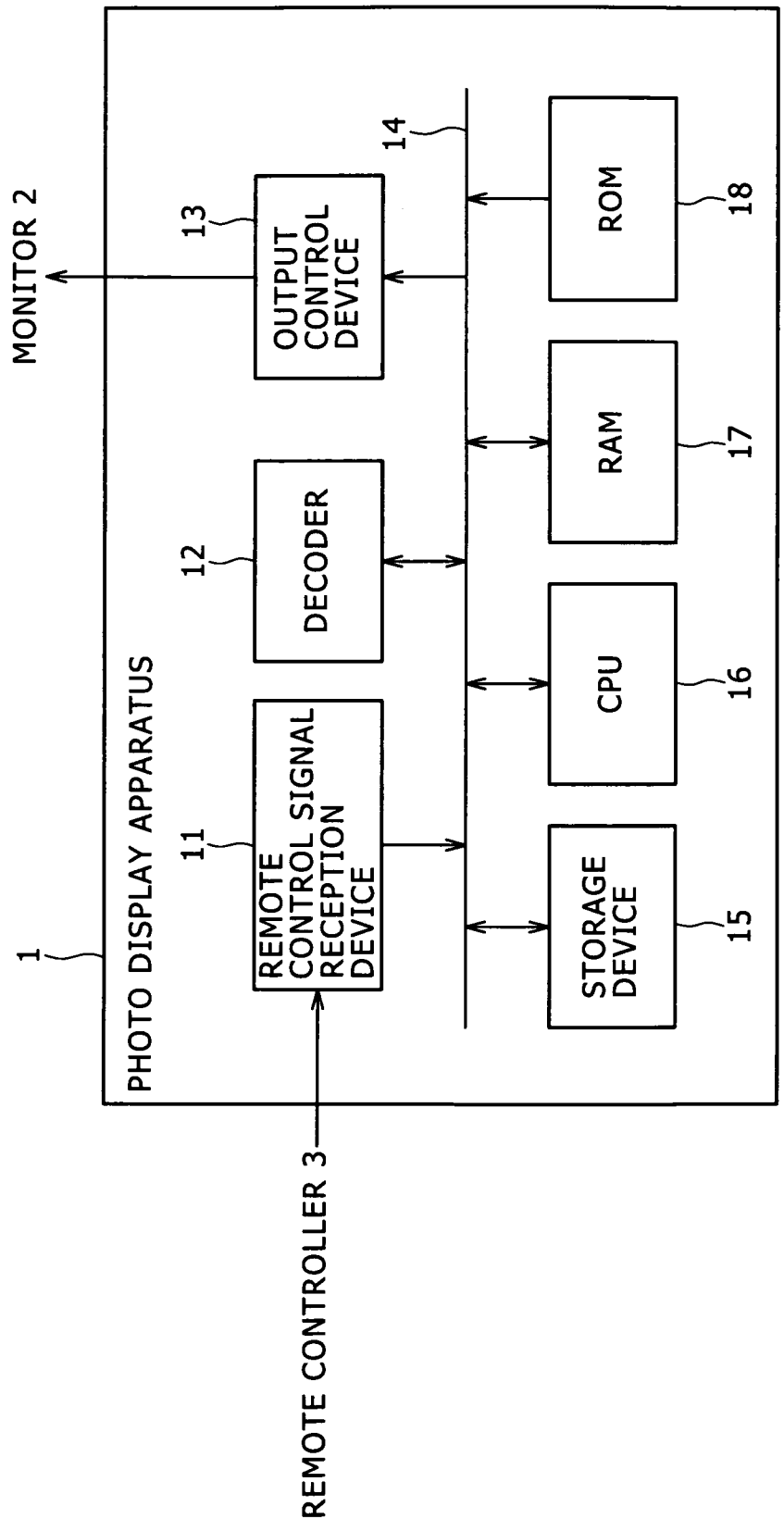
FIG. 11 is a block diagram showing an example of a configuration of the photograph display apparatus shown in FIG. 1.

FIG. 11 shows an example of a configuration of the photograph display apparatus 1.

Referring to FIG. 11, the photograph display apparatus 1 includes a remote control signal reception device 11, a decoder 12, an output control device 13, a bus 14, a storage device 15, a CPU 16, a random access memory (RAM) 17, and a read only memory (ROM) 18. The components mentioned are connected to each other by the bus 14.

The remote control signal reception device 11 receives a signal from the remote controller 3 and detects an operation of the user. The remote control signal reception device 11 outputs information representative of the substance of an operation of the user such as depression of the right key, left key or start/end key to the CPU 16 through the bus 14.

The decoder 12 reads out data of photographs of an object of reading ahead, whose decoded data need be prepared, from the storage device 15 through the bus 14 and stores the read out data into the RAM 17 under the control of the CPU 16. The RAM 17 serves as a memory having a storage capacity sufficient to store decoded data of a plurality of photographs.

The output control device 13 reads out the decoded data from the RAM 17 under the control of the CPU 16 and then controls the monitor 2 to display the photograph based on the read out data.

The storage device 15 is formed from a hard disk, a flash memory or the like and records data of photographs fetched from such an apparatus as a digital camera, a personal computer or a photo storage through an interface not shown.

The CPU 16 loads a program stored in the ROM 18 into the RAM 17 and executes the program to carry out a reading ahead process and so forth to control operation of the entire photograph display apparatus 1.

Figure 12:
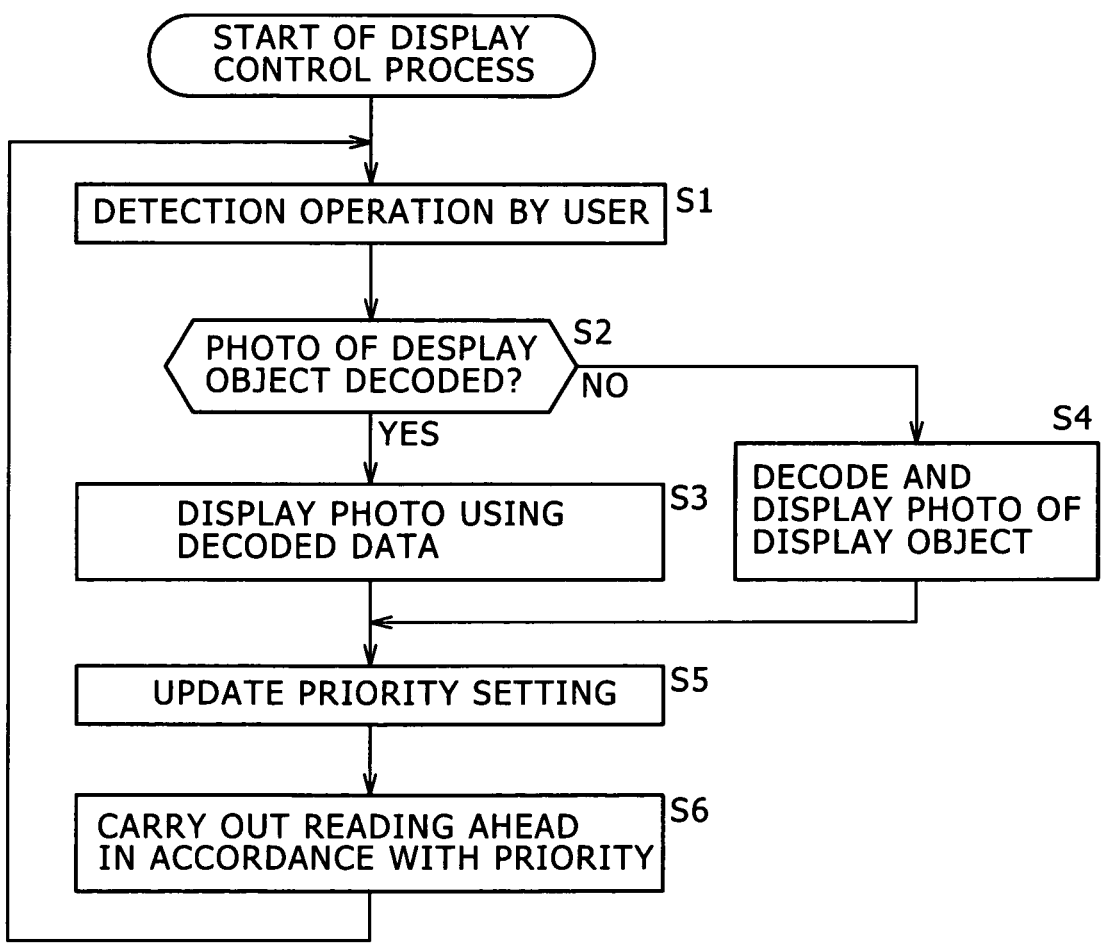
FIG. 12 is a flow chart illustrating a display control process of the photograph display apparatus shown in FIG. 1.

Now, processes of the photograph display apparatus 1 which controls display of photographs are described with reference to a flow chart of FIG. 12. Here, it is assumed that one photograph is selected already and displayed in an enlarged scale.

At step S1, the remote control signal reception device 11 detects an operation of the right key or the left key by the user based on a signal from the remote controller 3. The remote control signal reception device 11 outputs information representative of the substance of the detected operation to the CPU 16.

At step S2, the CPU 16 decides whether or not a photograph of an object of display is decoded already.

If it is decided at step S2 that a photograph of an object of display is decoded already, then at step S3, the CPU 16 controls the output control device 13 to display the photograph of the object of display based on the decoded data stored in the RAM 17.

On the other hand, if it is decided at step S2 that the photograph of an object of display is not decoded as yet, then the CPU 16 controls the decoder 12 to decode the data of the photograph and store the decoded data into the RAM 17 at step S4. Further, the CPU 16 controls the output control device 13 to display the photograph of the object of display based on the decoded data.

At step S5, the CPU 16 updates the setting of the priority in response to the direction of the operation by the user.

At step S6, the decoder 12 carries out reading ahead in such a manner as described above in accordance with the priority. Thereafter, the processing returns to step S1 to repeat the processes at the steps beginning with step S1.

By the processes described above, the photograph designated by the user can be displayed rapidly.

While, in the foregoing description, four photographs can be read ahead in addition to one photograph displayed actually, more than four photographs may be read ahead.

Further, in the foregoing description, the rightward direction of an operation by the user corresponds to the rightward direction in the array of the photographs #1 to #10 arrayed in the horizontal direction as seen in FIG. 5 while the leftward direction of an operation by the user corresponds to the leftward direction in the array of the photographs #1 to #10 and the user changes over the display of a photograph by an operation in the leftward or rightward direction, the display of a photograph may be changed over otherwise by an operation in the upward or downward direction.

In this instance, for example, the upward direction of an operation by the user corresponds to the rightward direction in the array of the photographs #1 to #10 arrayed in the horizontal direction while the downward direction of an operation by the user corresponds to the leftward direction in the array of the photographs #1 to #10.

Such reading ahead of photographs as described above can be carried out by various apparatus which control display of photographs.

While the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

Figure 13:
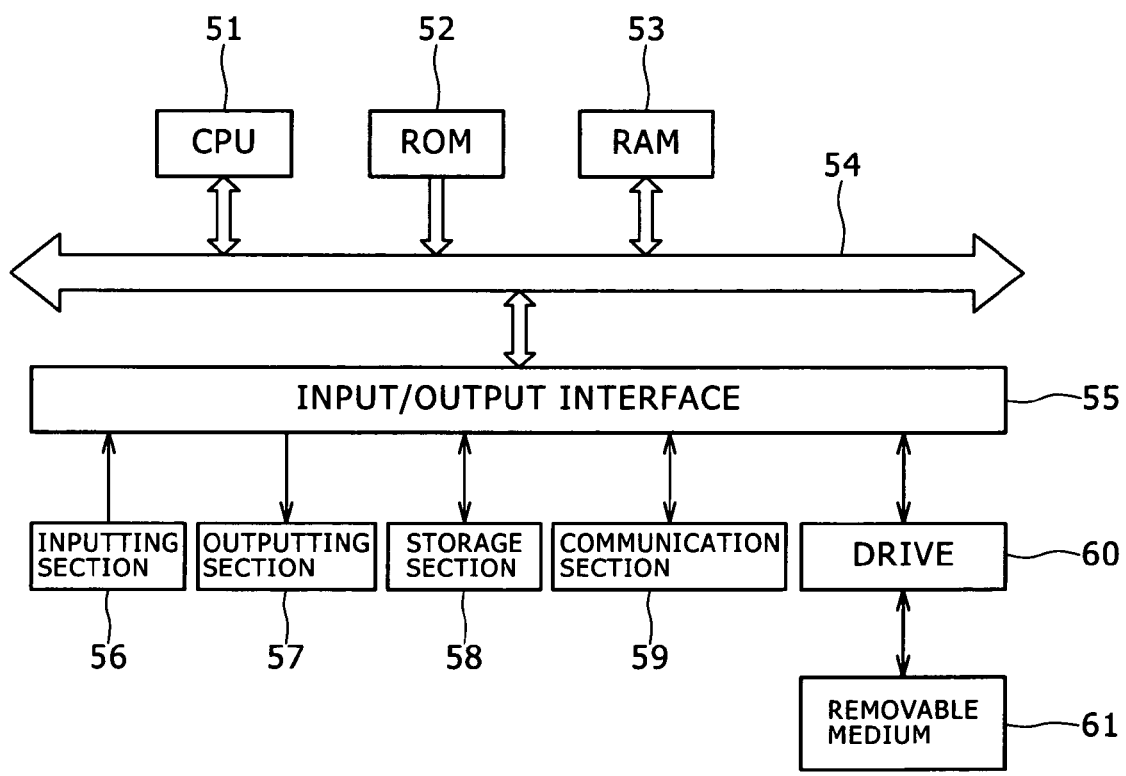
FIG. 13 is a block diagram showing an example of a hardware configuration of a computer.

FIG. 13 shows an example of a hardware configuration of a computer which executes the series of processes described hereinabove in accordance with a program.

A CPU 51, a ROM 52 and a RAM 53 are connected to each other by a bus 54.

Further, an input/output interface 55 is connected to the bus 54. An inputting section 56 including a keyboard, a mouse, a microphone and so forth, an outputting section 57 including a display unit, a speaker and so forth, a storage section 58 formed from a hard disk, a nonvolatile memory or the like, a communication section 59 including a network interface and so forth, and a drive 60 for driving a removable medium 61 such as an optical disk or a semiconductor memory are connected to the input/output interface 55.

In the computer configured in such a manner as described above, the CPU 51 loads a program stored, for example, in the storage section 58 into the RAM 53 through the input/output interface 55 and the bus 54 and then executes the program to carry out the series of processes described above.

The program to be executed by the CPU 51 is, for example, recorded in and provided together with the removable medium 61 or provided through a wired or wireless transmission medium such as a local area network, the Internet or digital broadcasting, and is installed into the storage section 58.

It is to be noted that the program to be executed by the computer may be of a type wherein processes are executed in a time series in the order as described in the present specification or of another type wherein processes are executed in parallel or executed at a necessary timing such as when it is called.

While a preferred embodiment of the present invention has been described using specific terms, such description is for illustrative purposes only, and it is to be understood that changes and variations may be made without departing from the spirit or scope of the following claims.

What is claimed is:

1. A display control apparatus for displaying an image from among a plurality of images arrayed in a predetermined order in an enlarged scale, comprising:
   storage means having a storage area sufficient to store decoded data of a plurality of images;
   detection means for detecting an operation in a predetermined direction by a user;
   display control means for causing, when an image is to be displayed in an enlarged scale in response to detection of an operation by the user by said detection means, an image of an object to be displayed in an enlarged scale based on the decoded data stored in said storage means so as to be used for display of the image of the object; and
   decoding means for storing the decoded data of a predetermined number of images positioned in a direction corresponding to the direction of the operation by the user with reference to the position of the image displayed by said display control means in the array of the images in the predetermined order into said storage means and storing the decoded data of a number of images smaller than the predetermined number which are positioned in a direction corresponding to a direction opposite to the direction of the operation by the user into said storage means,
   wherein when the user executes an operation in the direction opposite to the operation in a predetermined direction, selected ones of the predetermined number of images are deleted from the storage means one-by-one, and selected ones of the arrayed images, other than an image displayed upon the execution of the operation in the direction opposite and the images of the predetermined number of images, are decoded and stored in the storage means one-by-one, such that deletion of an image and storage of an image are alternately performed on an image-by-image basis, the deletions occurring in descending order of distance from the image displayed upon the execution of the operation in the direction opposite.

2. The display control apparatus according to claim 1, wherein said decoding means stores the decoded data of one image positioned in the direction corresponding to the direction of the operation by the user into said storage means and then stores the decoded data of one image positioned in the direction corresponding to the direction opposite to the direction of the operation by the user into said storage means.

3. The display control apparatus according to claim 2, wherein said decoding means stores the decoded data of one image positioned in the direction corresponding to the direction opposite to the direction of the operation by the user into said storage means and then stores the decoded data of an image or images positioned in the direction corresponding to the direction of the operation by the user into said storage means.

4. A display control method for a display control apparatus which includes storage means having a storage area sufficient to store decoded data of a plurality of images and displays an image from among a plurality of images arrayed in a predetermined order in an enlarged scale, comprising the steps of:
   detecting an operation in a predetermined direction by a user;
   causing, when an image is to be displayed in an enlarged scale in response to detection of an operation by the user, an image of an object to be displayed in an enlarged scale based on the decoded data stored in the storage means so as to be used for display of the image of the object; and
   storing the decoded data of a predetermined number of images positioned in a direction corresponding to the direction of the operation by the user with reference to the position of the displayed image in the array of the images in the predetermined order into the storage means and storing the decoded data of a number of images smaller than the predetermined number which are positioned in a direction corresponding to a direction opposite to the direction of the operation by the user into the storage means,
   wherein when the user executes an operation in the direction opposite to the operation in a predetermined direction, selected ones of the predetermined number of images are deleted from the storage means one-by-one, and selected ones of the arrayed images, other than an image displayed upon the execution of the operation in the direction opposite and the images of the predetermined number of images, are decoded and stored in the storage means one-by-one, such that deletion of an image and storage of an image are alternately performed on an image-by-image basis, the deletions occurring in descending order of distance from the image displayed upon the execution of the operation in the direction opposite.

5. A non-transitory computer-readable medium having stored thereon a computer-readable program for causing a computer to execute a display control method for a display control apparatus which includes storage means having a storage area sufficient to store decoded data of a plurality of images and displays an image from among a plurality of images arrayed in a predetermined order in an enlarged scale, the method comprising the steps of:

detecting an operation in a predetermined direction by a user;

causing, when an image is to be displayed in an enlarged scale in response to detection of an operation by the user, an image of an object to be displayed in an enlarged scale based on the decoded data stored in the storage means so as to be used for display of the image of the object; and storing the decoded data of a predetermined number of images positioned in a direction corresponding to the direction of the operation by the user with reference to the position of the displayed image in the array of the images in the predetermined order into the storage means and storing the decoded data of a number of images smaller than the predetermined number which are positioned in a direction corresponding to a direction opposite to the direction of the operation by the user into the storage means, wherein when the user executes an operation in the direction opposite to the operation in a predetermined direction, selected ones of the predetermined number of images are deleted from the storage means one-by-one, and selected ones of the arrayed images, other than an image displayed upon the execution of the operation in the direction opposite and the images of the predetermined number of images, are decoded and stored in the storage means one-by-one, such that deletion of an image and storage of an image are alternately performed on an image-by-image basis, the deletions occurring in descending order of distance from the image displayed upon the execution of the operation in the direction opposite.

6. A display control apparatus for displaying an image from among a plurality of images arrayed in a predetermined order in an enlarged scale, comprising:

a storage section having a storage area sufficient to store decoded data of a plurality of images;

a detection section configured to detect an operation in a predetermined direction by a user;

a display control section configured to cause, when an image is to be displayed in an enlarged scale in response to detection of an operation by the user by said detection section, an image of an object to be displayed in an enlarged scale based on the decoded data stored in said storage section so as to be used for display of the image of the object; and a decoding section configured to store the decoded data of a predetermined number of images positioned in a direction corresponding to the direction of the operation by the user with reference to the position of the image displayed by said display control section in the array of the images in the predetermined order into said storage section and storing the decoded data of a number of images smaller than the predetermined number which are positioned in a direction corresponding to a direction opposite to the direction of the operation by the user into said storage section, wherein when the user executes an operation in the direction opposite to the operation in a predetermined direction, selected ones of the predetermined number of images are deleted from the storage section one-by-one, and selected ones of the arrayed images, other than an image displayed upon the execution of the operation in the direction opposite and the images of the predetermined number of images, are decoded and stored in the storage section one-by-one, such that deletion of an image and storage of an image are alternately performed on an image-by-image basis, the deletions occurring in descending order of distance from the image displayed upon the execution of the operation in the direction opposite.

\* \* \* \* \*